ENCODER ADDER

Original Filed Sept. 1, 1965

Harold R. Dell
Merrill J. Maloney

BY Edward A. Robinson
ATTORNEY

INVENTORS
HAROLD R. DELL
MERRILL J. MALONEY
BY Edward A. Robinson
ATTORNEY

United States Patent Office 3,393,304

Patented July 16, 1968

3,393,304
ENCODER ADDER

Harold R. Dell, Palo Alto, and Merrill J. Maloney, Los Altos Hills, Calif., assignors to General Precision Systems Inc., a corporation of Delaware Original application Sept. 1, 1965, Ser. No. 490,762, now Patent No. 3,346,729, dated Oct. 10, 1967. Divided and this application Dec. 5, 1966, Ser. No. 599,224
6 Claims. (Cl. 235—172)

This invention relates to digital computing circuits and, more particularly, to digital arithmetic circuits for performing multiplications. This patent application is a division of a co-pending application, Ser. No. 490,762, filed Sept. 1, 1965 which matured to U.S. Letters Patent No. 3,346,729. Said co-pending application is a continuation of an application, Ser. No. 234,679, now abandoned, filed Nov. 1, 1962.

Traditionally, digital computing circuits perform multiplication operations by successive additions of a multiplicand quantity controlled in accordance with the digits of a multiplier quantity. Thus, the multiplicand is added to itself and column-shifted in repetitive operations, and because of the repetition, the process is relatively slow and time-consuming. Other multiplying circuits have been devised using core matrix circuits or the like wherein sensing leads associated with selected cores provide a digital indication of a product. Such a matrix arrangement is costly because of the core arrangements and because special-current, pulse-generating circuits are required to reverse the magnetic polarity of the cores. Furthermore, a matrix arrangement must be provided with a means for propagating "carry" signals which may be generated by lower order multiplication operations and must be utilized to modify the higher order products. In a decimal system of multiplication, a "carry" from one order is usually less than the decimal 10 and may be passed to the next higher order. However, in binary multiplication, carries of 10 (decimal 2) and much greater are commonly encountered, and multiple-order carries must be propagated. The propagation of multiple-order carry signals has proven to be awkward and time-consuming.

It is an object of this invention to provide an improved multilevel adder for receiving multiple input signals and for generating a sum output signal together with a first-order carry signal and a carry signal of a higher order which may be directly passed to other adders associated with the higher orders of output digits.

Numerous other objects and advantages will be apparent throughout the progress of the specification which follows. The accompanying drawings illustrate a certain exemplary embodiment of the invention and the views therein are as follows.

Figure 1:
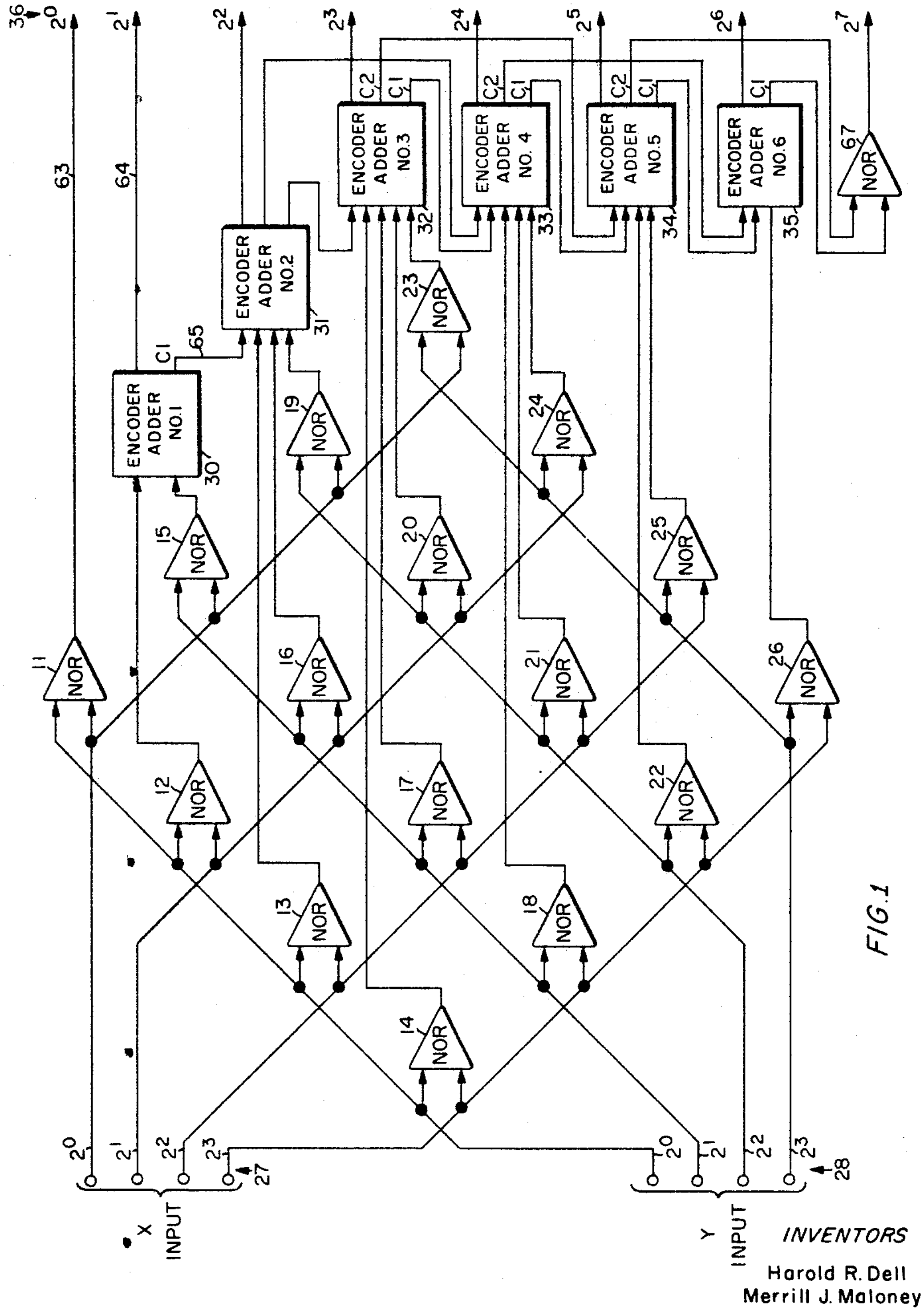
FIGURE 1 is a circuit diagram of the matrix multiplier of this invention illustrating the arrangement of NOR circuits and encoder adder circuits.

Briefly stated, according to a preferred embodiment of this invention, a plurality of NOR circuits 11 through 26 is arranged in a matrix as shown in FIGURE 1. Digital input signals may be applied to input terminals 27 connecting to the rows of the matrix which are shown as conductive leads extending downwardly to the right and coupling to an input lead of each of the NOR circuits of the respective rows. A second group of input terminals 28 will pass further signals to leads extending upwardly to the right in columns of the matrix and connecting with further input terminals of the respective NOR circuits.

Each of the NOR circuits 11 through 26 includes an output lead which passes signals along the diagonals of the matrix to input terminals of respective encoder adder circuits 30 through 35. Each of the encoder adder circuits includes a plurality of input terminals, each coupled to one of the output leads from the NOR circuits of the matrix diagonals, and further input terminals which may be coupled to carry-signal output leads of lower order encoder adder circuits. Output signals representative of the product of the two-input quantities will appear at the various output terminals 36.

Briefly, the encoder adder circuits include a first transistor 38 (see FIGURE 3) for generating a sum output signal and further transistors 39 and 40 for generating first- and second-order carry output signals respectively. While each of the transistors is normally biased into a state of nonconduction, the input signals which may appear on any combination or all of the input terminals 41 are coupled to each of the transistors by analog resistors and will tend to bias the transistors into conduction. In the case of the sum output transistor 38, the biasing is such that a signal applied to any one of the input terminals 41 will cause the transistor 38 to become conductive. In the case of the first-order transistor 39, a signal appearing on any two of the input terminals 41 will cause the transistor 39 to become conductive. A resistive means 43 coupled between the transistors 38 and 39 will cancel the effective bias from any two of the input terminals to inhibit conduction of the transistor 38. However, biasing current received from three or more of the input signals will overcome the effect of the biasing resistor 43 to restore the transistor 38 into conduction. The biasing of the second-order carry transistor 40 is such that four simultaneous input signals must be received to cause conduction therein for the generation of a second-order carry signal. When the second-order carry transistor 40 conducts, a resistive means 44 will tend to inhibit conduction of the transistor 38, and a resistive means 45 will tend to inhibit conduction of the transistor 39. However, when simultaneous input signals are received on all five input terminals, the effect of the inhibiting bias through the resistor 44 will be overcome, and conduction will be restored in the transistor 38.

Figure 2:
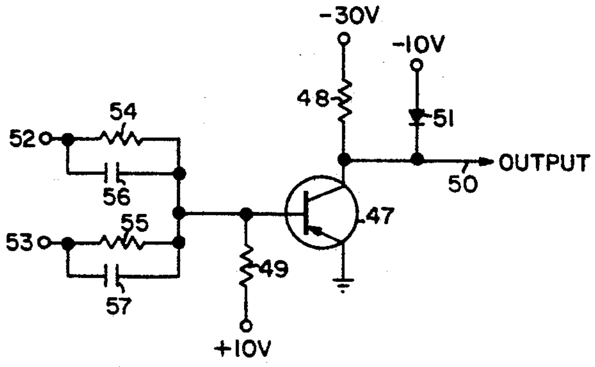
FIGURE 2 is a circuit diagram of a typical NOR circuit which is shown in blocks in FIGURE 1.

The NOR circuits of FIGURE 1 may be of the type described in an article entitled, "A Generalized Resistor-Transistor Logic Circuit and Some Applications" by Dr. S. C. Chao, beginning on page 8 of IRE Transactions on Electronic Computers. The operation of the NOR circuits may be understood with reference to FIGURE 2. Each NOR circuit includes a transistor 47 which functions as an inverter-amplifier. The emitter electrode of the transistor 47 is directly coupled to ground reference potential, and the collector electrode is coupled to a negative reference voltage by a load resistor 48. The base electrode of the transistor 47 is coupled to a positive reference potential by a resistor 49 which normally biases the transistor 47 into a state of nonconduction. When the transistor 47 is nonconductive, the output signal appearing at a terminal 50 will assume a negative reference voltage which is accurately regulated by a clamping diode 51. As shown in FIGURE 2, the diode 51 is coupled to a negative 10 volts reference potential and, as such, will maintain the output voltage from the NOR circuit at this voltage (minus 10 volts) at all times when the transistor 47 is in a state of nonconduction. The load resistor 48 provides a conductive path for currents which are supplied to any subsequent circuitry which may be coupled to the output terminal 50 while the diode 51 maintains the voltage regulation.

The NOR circuit of FIGURE 2 is shown with two input terminals 52 and 53 each coupled to the base electrode of the transistor 47 via a resistor 54–55. The input signals applied to the terminals 52 and 53 may be deemed to vary between zero voltage (ground potential) and a negative 10-volt reference voltage. If both of the input terminals remain grounded (no input signals), the effect of the positive biasing potential via the resistor 49 will maintain the transistor 47 in the state of nonconduction, and the output voltage appearing at the terminals 50 will be maintained at the negative 10-volt reference level. However, if negative input signals are impressed upon either or both of the terminals 52 and 53, the base electrode of the transistor 47 will become negatively biased with respect to the grounded emitter electrode, and the transistor will conduct. When conductive, the transistor 47 will effectively ground the output terminal 50, causing a zero output voltage. It will therefore be appreciated that the output signal from the NOR circuits will be a negative 10-volt reference voltage when no negative input signals are impressed upon either of the input terminals. If a negative signal is impressed on either or both input terminals, the output voltage will become zero or substantially ground potential. As shown in FIGURE 2, the input resistors 54 and 55 are bypassed by parallel-connected capacitors 56 and 57, which will effectively improve the response characteristic of the circuit by decreasing the time required for the circuit to respond to changing input voltages. Thus, when a steep front of a square wave appears at either of the input terminals 52 and 53, the high frequencies will be passed by the capacitors to the transistor 47, while the steady-state values of the square wave will be passed by the resistors. The NOR circuit of FIGURE 2 is illustrated with two input terminals, in accordance with the requirement of the various NOR circuits shown in FIGURE 1.

Although FIGURE 2 shows a NOR circuit with two input leads, NOR circuits may be constructed with any desired number of inputs to fit the requirements of a circuit designer. From a logical or functional viewpoint, a NOR circuit as shown in FIGURE 2 is the equivalent of an AND circuit followed by an inverter. The multiple input elements, all coupled to the single-base electrode of the transistor 47, effectively constitute a resistive AND circuit, and the transistor itself functions as an inverter and provides power gain. Obviously, the circuit of FIGURE 2 could be provided with but a single input terminal 52 and input imperance elements 54 and 56. In such a case, the circuit would constitute an inverter, and may be used as shown in the blocks 59, 60, and 61 of FIGURE 3 where it is desired to invert the sum and carry output signals for subsequent circuitry.

Figure 3:
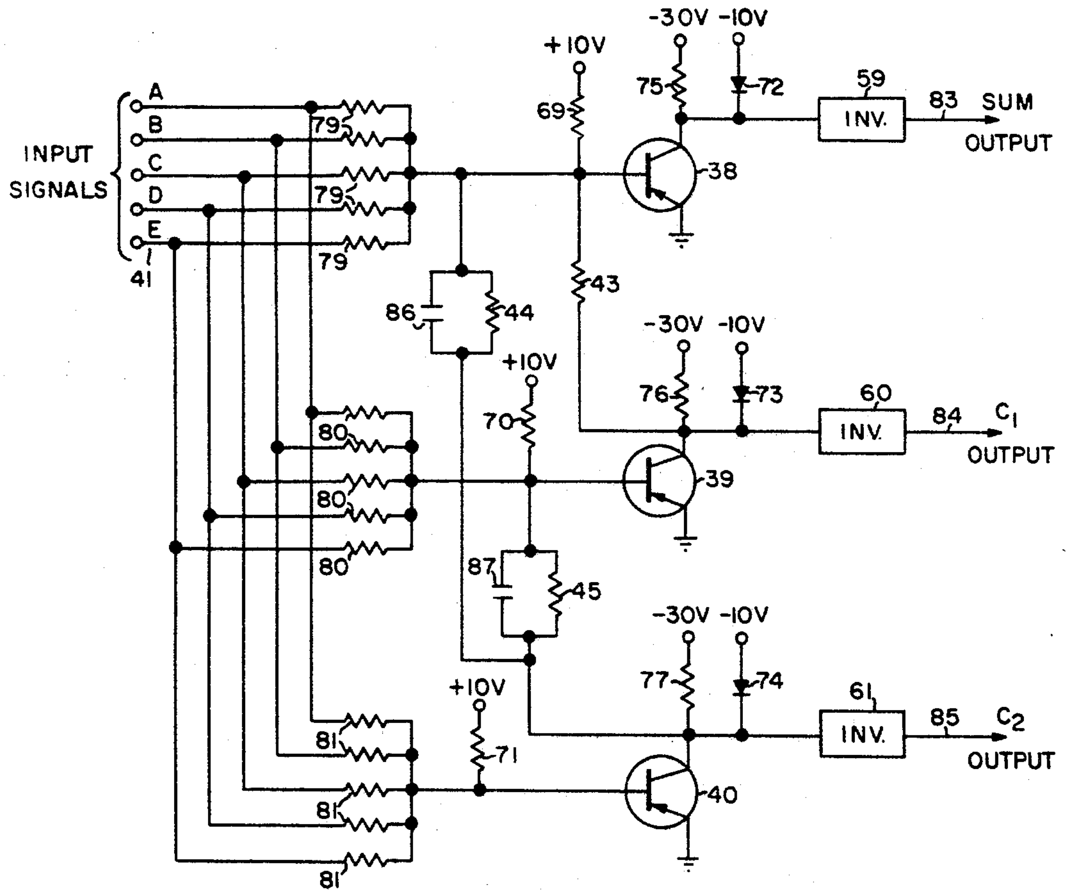
FIGURE 3 is a circuit diagram of a five-input, three-transistor encoder adder circuit which is shown as blocks in FIGURE 1.

The NOR circuits 11 through 26 are arranged in a rectangular pattern or matrix which is shown in FIGURE 1 with the X and Y axes (the rows and columns) extending obliquely. Each of the NOR circuits includes two input leads respectively connected to a row and a column lead from the X and Y input terminals 27 and 28. In the simplified circuit of FIGURE 1, the matrix includes 16 NOR circuits in a four-by-four rectangle and coupled to four X and Y input terminals. In this arrangement, two four-digit binary numbers may be multiplied together to obtain an eight-digit binary product. A negative 10-volt input signal will be representative of the binary "0," while zero or ground voltage will be representative of the binary "1." The output signals appearing at the terminals 36 will likewise be of the two discrete levels, but, in this case, a negative 10 volts will be representative of the binary "1" while the zero or ground voltage will be representative of the binary "0." Obviously, if further circuitry of a computer requires different standards (i.e., 0 volts representative of a 1, and −10 volts representative of a 0), this may be accomplished be eliminating the inverter circuits 59 from the encoder adder circuits as shown by FIGURE 3, and by including an inverter circuit in an output lead 63.

The NOR circuit 11 is coupled to receive the least significant bit input signals from both the X input terminals

27 and the Y input terminals 28, and the output lead 63 from the NOR circuit 11 provides an indication of the least significant product bit. In the multiplication of the least significant bits, if either or both of the bit inputs are binary 0's, the output signal on the lead 63 will be a binary 0, but if both inputs to the NOR circuit 11 are representative of a binary 1, the signal on the output lead 63 will likewise be representative of a binary 1. The NOR circuit 12 and the NOR circuit 15 are coupled to the least significant input terminal of one of the groups of terminals 27–28 and the second or next more significant terminal of the other group. If both inputs to either the NOR circuit 12 or the NOR circuit 15 are binary 1's, the output therefrom will be a binary 1 of the second order. The encoder adder circuit 30 will generate a binary 1 of the second-order product output signal if a binary 1 appears from either of the NOR circuits 12 or 15. However, if a binary 1 appears from both such circuits 12 and 15, the encoder adder circuit 30 will combine the signals to generate a zero output signal on a lead 64 and a first-order carry signal on a lead 65 which is passed to the next most significant order of the encoder adder circuit 31.

By similar logic, we may conclude from the matrix arrangement of FIGURE 1 that each of the NOR circuits 11 through 26 will pass output signals along the various leads of the respective matrix diagonal to the encoder adder circuits which are associated with particular binary orders of the product output. In each case, if more than one signal appears from the NOR circuits of a single matrix diagonal, the various signals are added together with carry signals from lever orders by the encoder adder circuits 31 through 35. A final or most significant bit representative of the binary quantity $2^7$ (demical 128) will be generated by a NOR circuit 67 which may receive either a first-order carry signal from the encoder adder 35 or a second-order carry signal from the adder 34. It may be appreciated that no product combination of the two 4-bit binary input signals X and Y will produce a binary product number of greater than $2^7$ (decimal 128), and, more specifically, it may be appreciated from the mathematics that the encoder adder circuit 34 and the encoder adder circuit 35 cannot pass simultaneous carry signals to the NOR circuit 67.

The article by S. C. Chao, supra, discloses a binary full adder using two transistors for respectively generating sum and carry signals from combinations of input signals which may be impressed upon three input terminals. The adder circuit disclosed by this author is a transistorized version of a Kirchhoff adder such as described on page 96 of a book by R. K. Richards entitled "Arithmetic Operations in Digital Computers" by the D. Van Nostrand Publishing Company. The transistorized Kirchhoff adder combines the input signals with analog resistors to selectively bias the sum and carry transistors into conduction. A single input signal will be sufficient to bias the sum transistor into conduction to provide a sum output signal. The combination of two or three input signals will bias the carry transistor into conduction to generate a carry signal. A biasing resistor connecting between the carry transistor and the sum transistor tends to inhibit conduction in the sum transistor when the carry transistor is conductive. However, when three input signals are simultaneously applied to the Kirchhoff adder, the carry transistor will become conductive, and the inhibiting effect thereof will be overcome such that the sum transistor will also become conductive, thereby generating both sum and carry output signals.

The encoder adder circuit of FIGURE 3 includes five input terminals 41 and three stages represented by the transistors 38, 39, and 40. Such a circuit may be used for the blocks 32 and 33 of FIGURE 1. As will be indicated subsequently, the blocks 30, 31, 34, and 35 may be a simplification of the circuit shown in FIGURE 3, in that certain of the components may be eliminated.

Each of the transistors 38, 39, and 40 includes an emitter electrode which is directly grounded, and a base electrode coupled to a positive reference potential by respective resistors 69, 70, and 71. With the base electrode of these transistors biased positively, the transistors will normally be in a state of nonconduction. As such, the respective collector electrodes will assume a negative output potential which is clamped at the negative 10-volt level by respective diodes 72, 73, and 74. Respective load resistors 75, 76, and 77 each provide a path for current flow to load devices such as the inverter circuits 59, 60, and 61, which are coupled to and driven by the encoder adder circuits.

Each of the input terminals 41 is coupled to the base electrode of the transistor 38 via analog summing resistors 79. Similarly, each of the input terminals 41 is coupled to the base electrodes of the transistors 39 and 40 by corresponding summing resistors 80 and 81. The resistive values are so chosen that a single negative signal applied to any one of the terminals 41 will be passed by the corresponding resistor 79 and will overcome the positive biasing effect of the resistor 69 to cause the base electrode of the transistor 38 to be biased negatively with respect to ground, whereupon the transistor 38 will become conductive. This circuit has been built and successfully tested, using values of 10,000 ohms for each of the analog input resistors 79, 80, and 81, and a value of 1540 ohms for the resistor 69. In this case, the transistor 38 is normally nonconductive, but a single input signal applied to one of the terminals 41 will render the transistor conductive to provide a zero voltage output signal at the electrode thereof. As shown in FIGURE 3, the inverter circuit 39 will provide a final sum output at a terminal 83 such that a negative reference potential is indicative of a binary 1.

In the case of the first-order carry transistor 39, the resistor 70 is chosen to have a value of 1820 ohms and, as such, will maintain the transistor 39 normally nonconductive. The negative biasing effect of a single input signal applied through one of the analog resistors 80 will be insufficient to overcome the positive biasing effect of the resistor 70, and therefore a single input signal will not render the transistor 39 conductive. However, when two simultaneous negative voltages are applied to any two of the input terminals 41, the combined biasing effect of two of the resistors 80 is sufficient to overcome the inhibitive biasing of the resistor 70, and the transistor 39 will be rendered conductive. Therefore, a first-order carry signal will not appear at the output terminal 84 unless simultaneous input signals are applied to at least two of the input terminals 41.

A resistor 43 is normally coupled to a negative 10-volt biasing point of the collector electrode of the transistor 39. This biasing effect is combined with the biasing effect of the resistor 69. When the transistor 39 becomes conductive, the collector electrode thereof assumes a zero or ground voltage, and the negative biasing effect of the resistor 43 is eliminated. This may be deemed to be the equivalent of providing further positive bias to the transistor 38 at times when the transistor 39 is conductive. The value of the resistor 43 has been established at 5,000 ohms, as compared to the values of the analog input resistors 79, which are 10,000 ohms, and the effective conductivity or biasing effect of the resistor 43 is therefore twice that of the analog resistor 79. When the transistor 39 is conductive, the effective positive bias applied to the transistor 38 via the resistor 43 is substantially equal to the negative bias of two simultaneous input signals applied through the resistors 79. The positive bias of the resistor 43 has an inhibiting effect on the transistor 38, tending to hold this transistor in a state of nonconduction.

As indicated heretofore, a single input signal impressed upon one of the terminals 41 will render the transistor 38 conductive. On the other hand, two input signals simultaneously impressed upon the terminals 41 will result in an inhibiting bias, causing the transistor 38 to become nonconductive. However, if three simultaneous input signals are applied to the input terminals 41, the inhibiting bias will be overcome, and the transistor 38 will again become conductive to produce a sum output signal. Thus, we will appreciate that a single input signal will result in a sum output signal with no first-order carry; that two simultaneous input signals will result in no sum output signal but a first-order carry output signal; and that three simultaneous input signals will result in both a sum output signal and a first-order carry signal.

The second-order carry output signals are generated by the transistor 40 which is normally biased into a state of nonconduction by the resistor 71. The resistor 71 may be of a value of 2,800 ohms, as compared to the analog resistors 81 having values of 10,000 ohms. The ratio of these resistors 71–81 is so chosen that the transistor 40 will be normally nonconductive, and will remain nonconductive, with either 1, 2, or 3 simultaneous inputs being applied to the terminals 41. However, if four input signals are simultaneously applied to four of the terminals 41, the inhibitive biasing effect of the resistor 71 is overcome, and the transistor 40 is rendered conductive to generate a second-order carry signal on an output lead 85. When the transistor 40 becomes conductive, an effective positive bias is applied via the resistor 44 to the base electrode of the transistor 38. A parallel capacitor 86 may shunt the resistor 44 to decrease the response time and effectively speed up the adding circuit. The resistor 44 may have a value of 2,500 ohms and, as such, will have four times the effective conductivity of the various analog resistors 79. Therefore, when four simultaneous input signals are received at the terminals 41, the transistor 40 bceomes conductive, and an inhibiting signal is applied to the transistor 38 which will overcome the effect of four simultaneous input signals to render the transistor 38 nonconductive. However, if five simultaneous input signals are applied to the terminals 41, the combined biasing effect of all five of the resistors 79 will overcome the inhibiting bias of the resistor 44, and the transistor 38 will be rendered conductive.

The operation of the sum output transistor 38 may be summarized by noting that this transistor is normally nonconductive (with no input signals); it will become conductive to generate a sum output signal when a single input signal appears; it will become nonconductive when two simultaneous input signals appear; it will again become conductive to generate a sum output signal when three simultaneous input signals appear; it will become nonconductive with four simultaneous input signals; and it will again become conductive and will generate a sum output signal when five simultaneous input signals are applied to the terminals 41.

The resistor 45 is coupled between the second-order carry transistor 40 and the first-over carry transistor 39. The resistor 45 may be of a value of 2,500 ohms, as compared to the resistors 80 of a value of 10,000 ohms. It may be appreciated that the positive or inhibiting bias effect of the resistor 45 is equal to the negative biasing effect of four of the resistors 80. A capacitor 87 is connected in parallel with the resistor 45 to improve the response time of the circuit. As indicated heretofore, the transistor 39 will become conductive to generate a first-order carry when at least two negative input signals are applied via the resistors 80 to the base electrode thereof. Obviously, the transistor 39 will remain conductive when three input signals are similarly applied thereto. When four input signals are impressed upon the terminals 41, the inhibiting bias of the resistor 45 will overcome the biasing effect of the resistors 80 and will cause the transistor 39 to become nonconductive. Similarly, the biasing effect of the resistor 45 will overcome the combined biasing effect of five simultaneous input signals maintaining the transistor 39 in a state of nonconduction.

The circuit of FIGURE 3 may logically be extended to include two additional analog input resistors coupled to the base electrodes of the three transistors 38, 39, and 40 to provide a total of seven input terminals 41. If we were to extend this invention in this manner, we would appreciate that the simultaneous application of six signals would render the transistor 39 conductive in spite of the inhibiting effect of the transistor 40, and therefore both a first-order carry signal, and a second-order carry signal would be generated. In this event, two inhibiting signals would be applied to the sum output transistor 38 via the respective resistors 43 and 44, and the combined effect of six input signals would not be sufficient to render the transistor 38 conductive. However, a seventh simultaneously applied input signal would overcome the inhibiting bias of both resistors 43 and 44 to render the transistor 38 conductive.

This invention may be extended further by the addition of further input terminals 41, further input resistors 79, 80, and 81, and one or more additional transistors having similar biasing logic to the carry transistors 39 and 40. Thus, with an additional carry transistor, third-order carries could be generated for an enlarged matrix arrangement which would likewise be an extension of FIGURE 1. Since the first-order carry is generated by the simultaneous application of two input signals, and the second-order carry is generated by four simultaneous input signals, it logically follows that a third-order carry would be generated by eight simultaneous input signals, and a fourth-order carry would be generated by sixteen simultaneous input signals, etc. In a similar manner, the further transistor (not shown), for generating a third-order carry, would pass an inhibiting bias to the transistors 38, 29, and 40, which would be equivalent to eight input signals.

The circuits as heretofore described utilize input signals which may be of either of two discrete voltage levels. The two voltage levels indicated above are −10 volts and 0 or ground volts. Similarly, the output circuits of FIGURES 2 and 3 will generate two such voltage levels. The ratios of the resistors 79, 80, and 81 to the other biasing resistors 43, 44, 45, 69, 70, and 71 as disclosed herein are based on the voltage levels which are established as positive and negative 10 volts and 0 volts. Obviously, the "effective conductivity" of the biasing resistors may be varied by changing either the ratios, the ohmic values, or the ratios of voltages applied thereto.

The matrix multiplier of this invention has proven to be substantially faster in operation than those multipliers which perform repeated additions and shift operations of the multiplicand quantity to obtain the product quantity. For example, the multiplication of two 24-bit binary numbers by the method of repeated additions will require approximately 45 microseconds in presently available digital computers. Using a 24-by-24 matrix, in accordance with the teachings of this invention, the same multiplication may be performed in approximately 3.5 microseconds.

The encoder adder circuits of this invention essentially make it possible to add a column of binary digits in a single operation. As indicated heretofore, the circuit of FIGURE 3 may be expanded to include five transistors with 31 input terminals. Such a circuit will propagate signals representative of first-order carries, second-order carries, third-order carries, and fourth-order carries. In such an arrangement, the adding circuits of higher orders will require that some of the input terminals be connected to the carry output terminals of the lower order adding circuits, thereby decreasing the number of input terminals available for receiving signals from the NOR circuits of the matrix. Such encoder adder circuits having 28 input terminals could be used in conjunction with a 24-by-24 matrix of NOR circuits wherein 24 input terminals may be coupled to the NOR circuits of the longest matrix diagonal, and four input terminals may be coupled to receive carry signals from lower order adders.

Changes may be made in the form, construction, and arrangement of the parts without departing from the spirit of the invention or sacrificing any of its advantages, and the right is hereby reserved to make all such changes as fall fairly within the scope of the following claims.

The invention is claimed is follows:

1. A digital adder comprising a plurality of input terminals for receiving signals to be added; at least three output terminals including a sum output terminal, a first-order carry output terminal, and a second-order carry output terminal; a first controllable conduction device coupled to the sum output terminal for generating and passing a sum output signal thereto; a second controllable conduction device coupled to the first-order carry output terminal for generating and passing a first-order carry output signal thereto; a third controllable conduction device coupled to the second-order carry output terminal for generating and passing a second-order carry signal thereto; each of said controllable conduction devices being normally biased into a first state of conduction; an input impedance means coupled between each of the input terminals and each of the controllable conduction devices for passing input signals which will tend to bias the respective controllable conduction devices into a second state of conduction; an impedance means coupled between the second controllable conduction device and the first controllable conduction device for passing a signal which will tend to maintain the first controllable conduction device in the first state of conduction when the second controllable conduction device is in the second state of conduction; a further impedance means coupled between the third controllable conduction device and the first controllable conduction device for passing a signal which will tend to maintain the first controllable conduction device in the first state of conduction when the third controllable conduction device is in the second state of conduction; and a further impedance means coupled between the third controllable conduction device and the second controllable conduction device for passing a signal which will tend to maintain the second controllable conduction device in the first state of conduction when the third controllable conduction device is in the second state of conduction.

2. A digital adder comprising a plurality of input terminals for receiving signals to be added; at least three output terminals including a sum output terminal, a first-order carry output terminal, and a second-order carry output terminal; a first transistor coupled to the sum output terminal for generating and passing a sum output signal thereto; a second transistor coupled to the first-order carry output terminal for generating and passing a first-order carry output signal thereto; a third transistor coupled to the second-order carry output terminal for generating and passing a second-order carry output signal thereto; means for biasing each of said transistors into a normal state of non-conduction; an analog summing resistor coupled between each of the input terminals and each of the transistors for passing input signals tending to bias the respective transistors into conduction; resistive means coupled between the second transistor and the first transistor for passing a signal which will tend to inhibit conduction in the first transistor when the second transistor is conductive; further resistive means coupled between the third transistor and the first transistor for passing a signal which will tend to inhibit conduction in the first transistor when the third transistor is conductive; further resistive means coupled between the third transistor and the second transistor for passing a signal which will tend to inhibit conduction in the second transistor when the third transistor is conductive.

3. A digital encoder adder comprising a first transistor for generating a sum output signal, a second transistor for generating a first-order carry output signal, a third transistor for generating a second-order carry output signal, means for biasing each of said transistors normally into a state of nonconduction, a plurality of input terminals for receiving input signals, a plurality of analog summing resistors coupled between each of the transistors and each of the input terminals for passing input signals which will tend to bias the respective transistors into conduction, resistive means coupled between the second transistor and the first transistor for passing a signal which will tend to inhibit conduction in the first transistor when the second transistor is conductive, resistive means coupled between the third transistor and the first transistor for passing a signal which will tend to inhibit the first transistor when the third transistor is conductive, and a further resistive means coupled between the third transistor and the second transistor for passing a signal which will tend to inhibit conduction in the second transistor when the third transistor is conductive, said first transistor being operable to conduct and to generate a sum output signal when an input signal is impressed upon one of the input terminals, said second transistor being operable to conduct and to generate a first-order carry signal when input signals are impressed upon two of the input terminals, said third transistor being operable to conduct and to generate a second-order carry signal when input signals are impressed upon four of the input terminals.

4. A digital encoder adder in accordance with claim 3 wherein the resistive means coupled between the second transistor and the first transistor has substantially twice the effective conductivity of each of the analog summing resistors such that the signal passed from the second transistor to the first transistor will substantially cancel signals appearing on two of the input summing resistors coupled to the first transistor whereby said first transistor will be operable to conduct and pass a sum output signal when a signal appears on a single input resistor and when a signal appears on at least three input resistors.

5. A digital encoder adder in accordance with claim 4 wherein the resistive means coupled between the third transistor and the first transistor has substantially four times the effective conductivity of each of the analog summing resistors such that the signal passed from the third transistor to the first transistor will substantially cancel signals appearing on four of the input summing resistors coupled to the first transistor whereby said first transistor will be operable to conduct and pass a sum output signal when a signal appears on a single input resistor, when a signal appears on three input resistors, and when a signal appears on at least five input resistors.

6. A digital encoder adder in accordance with claim 5 wherein the resistive means coupled between the third transistor and the second transistor has substantially four times the effective conductivity of each of the analog summing resistors such that the signal passed from the third transistor to the second transistor will substantially cancel signals appearing on four of the input summing resistors coupled to the second transistor whereby said second transistor will be operable to conduct and pass a first-order carry output signal when a signal appears on two of the input resistors and when a signal appears on three of the input resistors.

References Cited

UNITED STATES PATENTS

| | | | |
|---|---|---|---|
| 3,156,816 | 11/1964 | Kosonocky et al. | 235—172 |
| 3,218,483 | 11/1965 | Clapper | 307—88.5 |

MALCOLM A. MORRISON, *Primary Examiner.*

V. SIBER, *Assistant Examiner.*